United States Patent
Beamish et al.

(10) Patent No.: US 7,254,381 B1
(45) Date of Patent: Aug. 7, 2007

(54) REDUCING DSP SCHEDULE BOTTLENECKS IN EDGE THROUGH PREMATURE USF DECODING

(75) Inventors: Norman J. Beamish, Costa Mesa, CA (US); Arun Sukheja, Irvine, CA (US); Mark S. Frank, Beaverton, OR (US)

(73) Assignee: Skyworks Solutions, Inc., Woburn, MA (US)

( * ) Notice: Subject to any disclaimer, the term of this patent is extended or adjusted under 35 U.S.C. 154(b) by 501 days.

(21) Appl. No.: 10/969,109

(22) Filed: Oct. 19, 2004

(51) Int. Cl.
*H04Q 7/32* (2006.01)
(52) U.S. Cl. .................. 455/334; 455/67.11; 455/452.2
(58) Field of Classification Search ................ 455/334, 455/67.11, 434, 445, 452.2, 453, 522, 200.1, 455/214, 226.1
See application file for complete search history.

(56) References Cited

U.S. PATENT DOCUMENTS 7,203,461 B2 * 4/2007 Chang et al. ............ 455/67.13
2002/0142728 A1 * 10/2002 Paul et al. ................ 455/67.1
2004/0253958 A1 * 12/2004 Chang et al. ............. 455/445
2006/0264180 A1 * 11/2006 Qiu ............................ 455/69

* cited by examiner

*Primary Examiner*—Edward F. Urban
*Assistant Examiner*—Blane J Jackson
(74) *Attorney, Agent, or Firm*—Farjami & Farjami LLP

(57) ABSTRACT

In one embodiment, a method is provided of communicating in a wireless communication system. The method comprises (a) setting a decrement burst variable to be equal to a predetermined number representing a number of bursts of data from which to prematurely decode a USF codeword, (b) receiving a received burst of data comprising USF related data related to a portion of a USF codeword, (c) extracting said USF related data from said equalized received burst of data, (d) determining if a burst number variable is equal to said decrement burst variable, (e) incrementing said burst number variable and repeating (b) through (d) if said burst number variable is not equal to said decrement burst variable, and (f) decoding said USF codeword if said burst number variable is equal to said decrement burst variable.

20 Claims, 4 Drawing Sheets

REDUCING DSP SCHEDULE BOTTLENECKS IN EDGE THROUGH PREMATURE USF DECODING

BACKGROUND OF THE INVENTION

1. Field of the Invention

The present invention is generally in the field of wireless communication systems. More specifically, the invention is in the field of wireless communication systems related to the Global System for Mobile Communications (GSM)/Enhanced Data for Global Evolution (EDGE) standards.

2. Background Art

In wireless communication systems multiple users may share a common communication channel. Some allocation of the available channel capacity to the users is typically made in order to avoid conflicts arising from multiple users transmitting information over the communication channel simultaneously. Allocation of user access to the communication channel is achieved by various forms of multiple access protocols.

For example, the GSM/EDGE standards utilize a protocol commonly referred to as time division multiple access (TDMA). In a TDMA system, a user's communication signal is transmitted in a uniquely assigned time slot. The time slots of the respective users do not overlap so that a given user's signal is separated from those of other users.

In a conventional GSM/EDGE system, a base station wirelessly transfers data to a mobile station (e.g. a handset) to inform the mobile station of the configuration of the link. From a portion of that data the mobile station determines the format in which it is to send data in the next interval back to the base station. A given EDGE data block comprises four bursts with one burst per frame. A given EDGE data block includes an uplink status flag (USF) codeword, as is known to those of ordinary skill in the art. There are eight possible USF codewords defined for EDGE, each comprising 36 bits. A USF codeword is used by the base station to inform the mobile station how to configure its uplink for the next transmission period.

In a GSM/EDGE system, four bursts are sent consecutively from the base station to the mobile station. A portion of each burst comprises USF data. The mobile station receives and decodes the data, determining what its transmission configuration should be for the following frame. The mobile station typically has less than about 4.615 milliseconds (ms) to decode the USF data and start transmitting data. Thus, a peak load is imposed on the wireless communication system.

The mobile station should act on the data contained in the USF codeword in the first frame subsequent to the reception of USF data. Thus, the USF data should be promptly decoded. Conventionally, the time interval available for decoding a USF codeword is relatively small. Consequently, schedule bottlenecks typically occur in a digital signal processor (DSP) of a conventional wireless communication system.

Thus, it is seen that there is need in the art for an improved method and system for communicating in EDGE/GSM. The system and method should allow for a relatively low error rate, while reducing schedule bottlenecks.

SUMMARY OF THE INVENTION

The present invention is directed to reducing DSP schedule bottlenecks in EDGE through premature USF decoding.

The invention overcomes the need in the art for an improved method and system for communicating in EDGE/GSM.

According to one embodiment of the invention, a method is provided of communicating in a wireless communication system. The method comprises (a) setting a decrement burst variable to be equal to a predetermined number representing a number of bursts of data from which to prematurely decode a USF codeword, (b) receiving a received burst of data comprising USF related data related to a portion of a USF codeword, (c) extracting said USF related data from said equalized received burst of data, (d) determining if a burst number variable is equal to said decrement burst variable, (e) incrementing said burst number variable and repeating (b) through (d) if said burst number variable is not equal to said decrement burst variable, and (f) decoding said USF codeword if said burst number variable is equal to said decrement burst variable.

According to another embodiment of the invention, a wireless communication system is provided including a base station and a mobile station communicating over an RF channel. The wireless communication system comprises a first module for (a) setting a decrement burst variable to be equal to a predetermined number representing a number of bursts of data from which to prematurely decode a USF codeword, a second module for (b) receiving a received burst of data comprising USF related data related to a portion of a USF codeword, a third module for (c) extracting said USF related data from said equalized received burst of data, a fourth module for (d) determining if a burst number variable is equal to said decrement burst variable, a fifth module for (e) incrementing said burst number variable and repeating (b) through (d) if said burst number variable is not equal to said decrement burst variable, and a sixth module for (f) decoding said USF codeword if said burst number variable is equal to said decrement burst variable.

According to another embodiment, a wireless communication system is provided including a computer readable medium including computer software program executable by a processor in a wireless communication system. The computer software program comprises code for (a) setting a decrement burst variable to be equal to a predetermined number representing a number of bursts of data from which to prematurely decode a USF codeword, code for (b) receiving a received burst of data comprising USF related data related to a portion of a USF codeword, code for (c) extracting said USF related data from said equalized received burst of data, code for (d) determining if a burst number variable is equal to said decrement burst variable, code for (e) incrementing said burst number variable and repeating (b) through (d) if said burst number variable is not equal to said decrement burst variable, and code for (f) decoding said USF codeword if said burst number variable is equal to said decrement burst variable.

Other features and advantages of the present invention will become more readily apparent to those of ordinary skill in the art after reviewing the following detailed description and accompanying drawings.

DETAILED DESCRIPTION OF THE INVENTION

The present invention is directed to reducing DSP schedule bottlenecks in EDGE through premature USF decoding. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
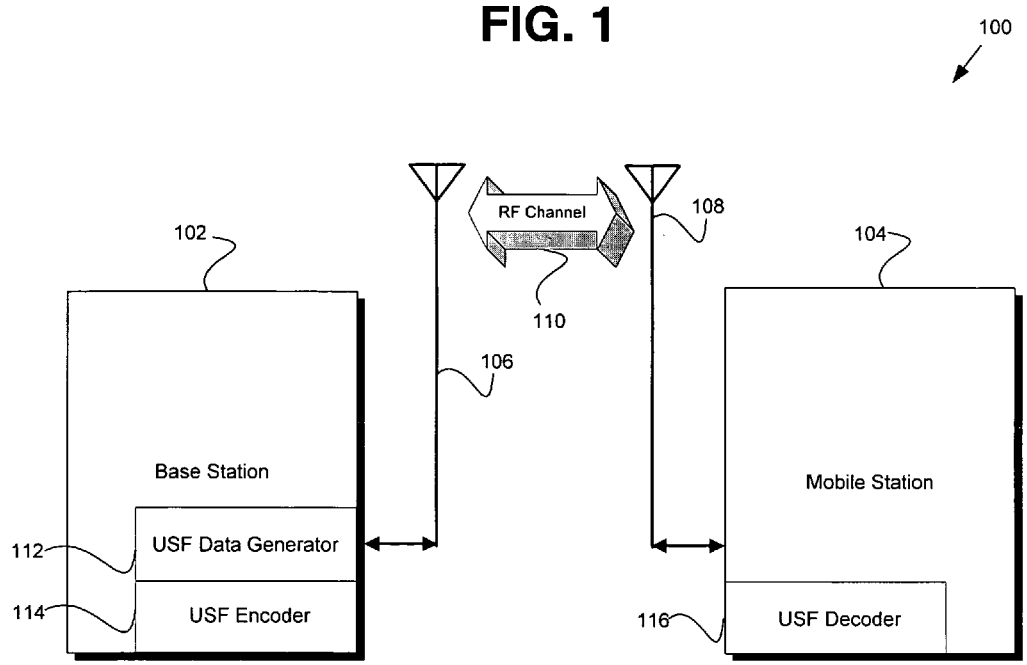
FIG. 1 illustrates a wireless communication system according to one embodiment of the invention.

FIG. 1 illustrates wireless communication system 100 according to one embodiment of the invention. It should be borne in mind that like or corresponding elements among the figures may be indicated by like or corresponding reference numerals.

Wireless communication system 100 comprises base station 102 and mobile station 104. Base station 102 and mobile station 104 are coupled to respective antennas 106 and 108. Base station 102 and mobile station 104 communicate with each other over radio frequency (RF) channel 110.

Base station 102 includes a radio transmitter and other digital and analog hardware coupled to antenna 106. Antenna 106 at base station 102 converts an electronic signal at the input of base station 102 to an electromagnetic signal that is appropriately conditioned to traverse RF channel 110. A reciprocal arrangement exists at the other end of RF channel 110. Antenna 108 at mobile station 104 receives the electromagnetic signal and converts the electromagnetic signal into an electronic signal.

USF data generator 112 generates USF data that is encoded as three bits by USF encoder 114. The three bits are converted into a 36-bit word divided into four nine-bit portions. Each nine-bit portion is transmitted with a given burst of the four bursts. In an EDGE block structure, four bursts equal one block. Therefore, a given block comprises three USF bits that have been encoded to a full 36 bits. USF decoder 116 takes the received encoded USF data, having accumulated the data over multiple bursts, and from that data determines what the USF word is (i.e., the three USF bits that were sent from the base station originally).

Figure 2:
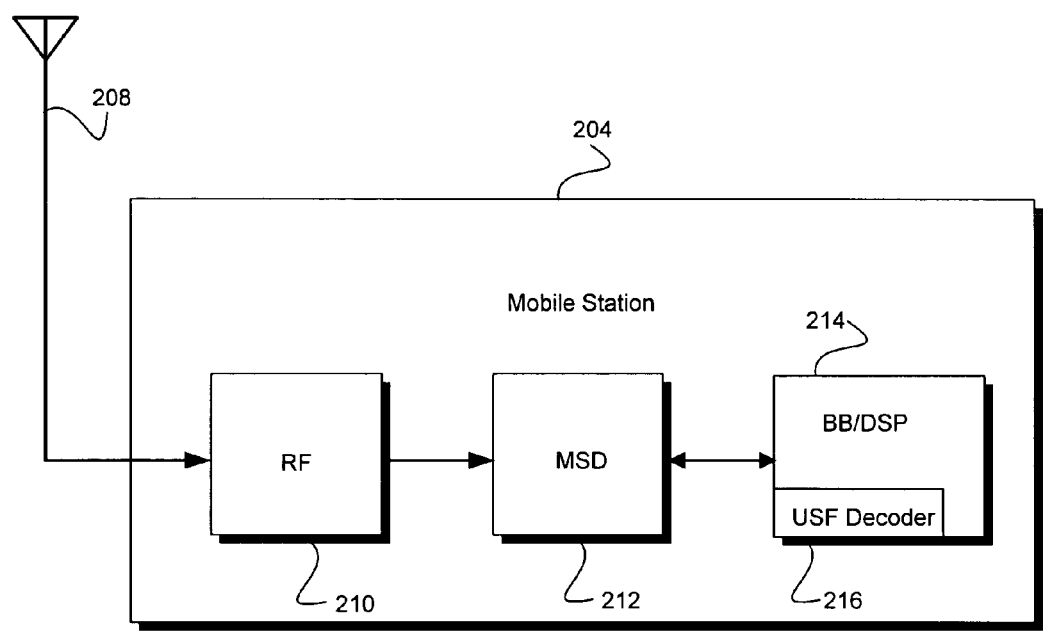
FIG. 2 illustrates the mobile station of FIG. 1 according to one embodiment of the invention.

Referring to FIG. 2, mobile station 204 comprises RF module 210, mixed signal device (MSD) 212, and baseband/digital signal processing (BB/DSP) module 214. RF module 210 receives input from antenna 208. RF module 210 comprises an RF chip or RF system that converts the analog RF signal to an analog BB signal. MSD 212 includes and analog-to-digital (A/D) converter that converts the BB signal into a digital signal. BB/DSP 214 includes USF decoder 216 and receives the signal from MSD 212. BB/DSP 214 is responsible for various digital signal processing, discussed herein.

Figure 3:
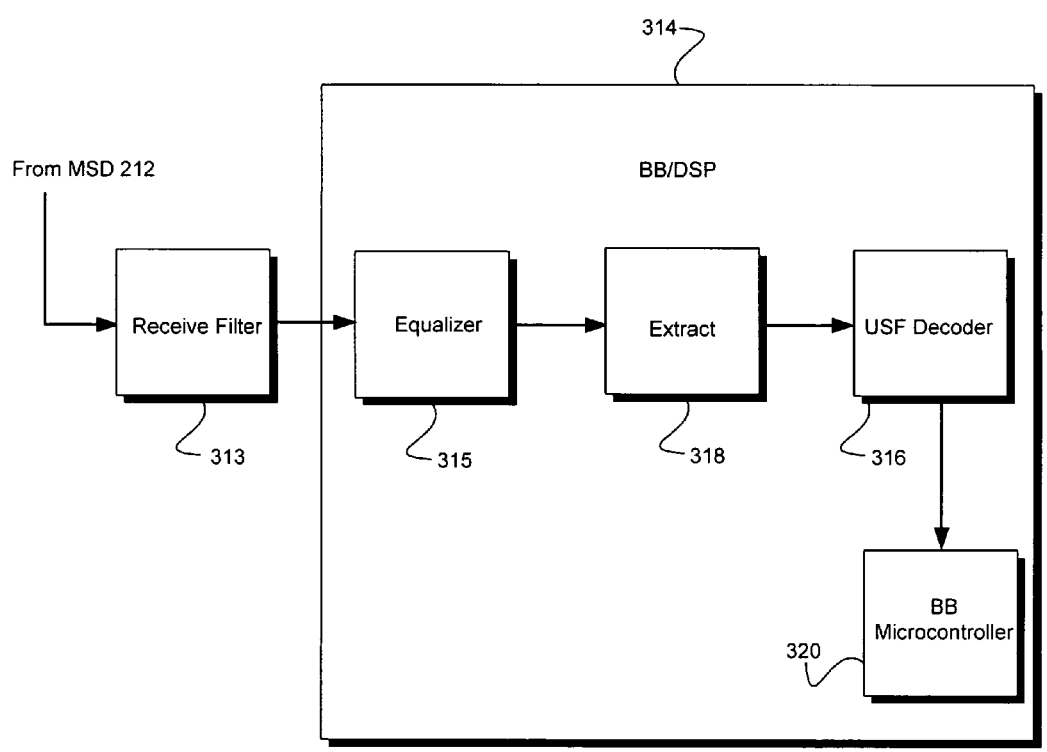
FIG. 3 illustrates the BB/DSP of FIG. 2 according to one embodiment of the invention.

FIG. 3 illustrates BB/DSP 314 of FIG. 2 according to one embodiment of the invention. An output of receive filter 313 is coupled to an input of BB/DSP 314. BB/DSP 314 comprises equalizer 315, extract module 318, USF decoder 316, and BB microcontroller 320. Receive filter 313 is on MSD 212 in one embodiment. In another embodiment, receive filter 313 is part of BB/DSP 314.

In keeping with embodiments of the invention, the received signal from the A/D converter in MSD 212 is passed through receive filter 313. The signal is then passed through equalizer 315. Equalizer 315 compensates for non-idealities or impairments of RF channel 110 to the extent that compensation is possible. Equalizer 315 contributes a significant computational load to the overall processing done at mobile station 104. Thus, equalizer 315 contributes to peak loading of BB/DSP 314. Minimizing such a peak loading would be desirable.

The signal passes from equalizer 315 to extract module 318. Extract module 318 extracts the raw encoded USF data from the current one of four received bursts once the data has been equalized. This extraction occurs for the four bursts. At USF decoder 316, the USF data is then decoded. Advantageously, as discussed herein, USF decoder 316 decodes the USF data after one, two, or three bursts only instead of from all four bursts. The USF data can still be recovered with sufficient accuracy, and peak processing requirements are thus advantageously lowered. Bottlenecks are consequently avoided. The decoded USF data is received by BB microcontroller 320. BB microcontroller 320 controls the operation of mobile station 104.

Figure 4:
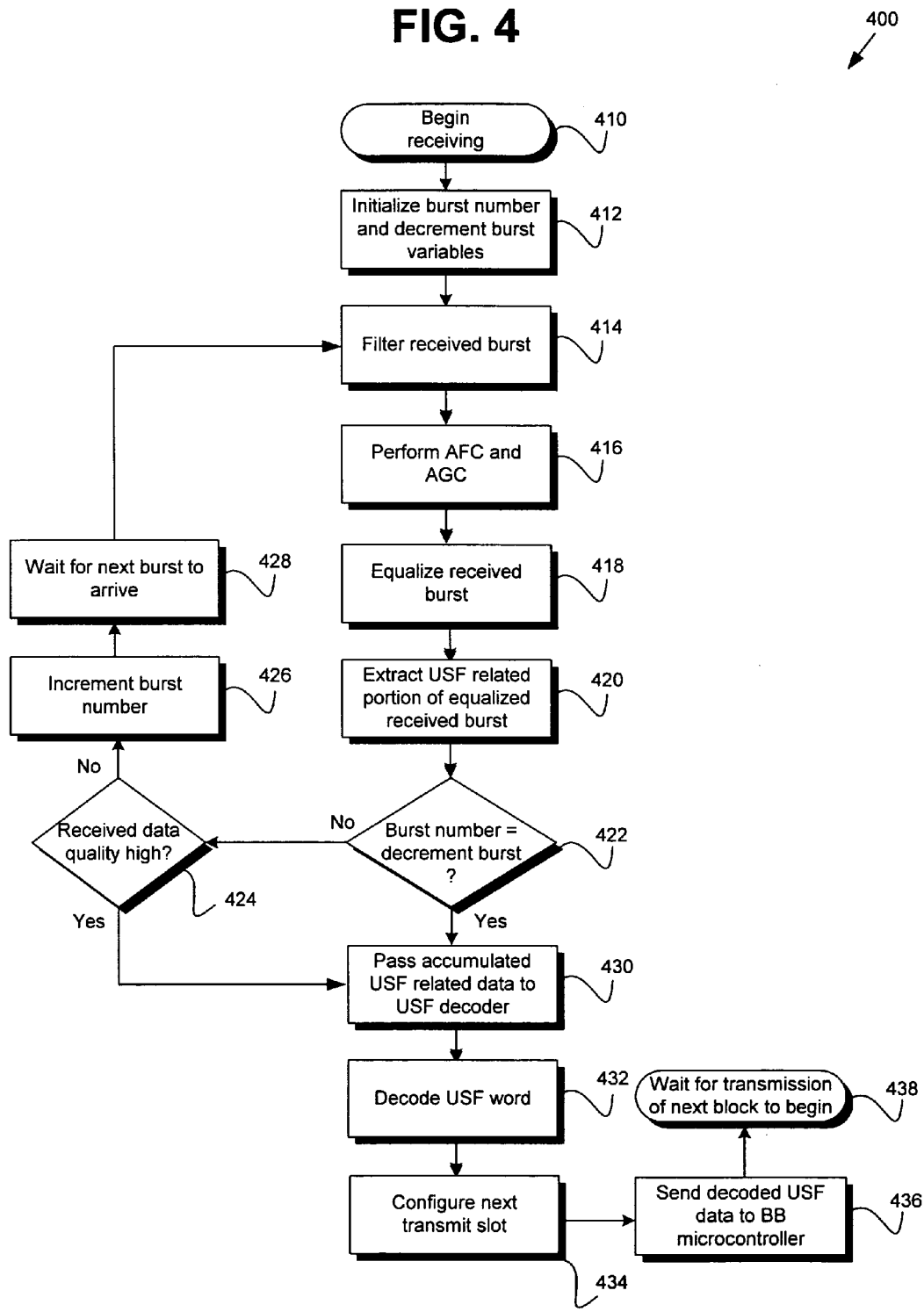
FIG. 4 illustrates a method of communicating in the wireless communication system of FIG. 1 according to one embodiment of the invention.

FIG. 4 shows flowchart 400 that describes the steps, according to one embodiment of the invention, of communicating in wireless communication system 100 according to one embodiment of the invention. Certain details and features have been left out of flowchart 400 that are apparent to a person of ordinary skill in the art. For example, a step may consist of one or more substeps or may involve specialized equipment, as is known in the art. While steps 410 through 438 indicated in flowchart 400 are sufficient to describe one embodiment of the present invention, other embodiments of the invention may use steps different from those shown in flowchart 400.

At step 410, in operation, mobile station 104 begins receiving a block of data. As mentioned herein, there are four bursts of data per one complete data block in GSM/EDGE. At step 412, a burst number variable is initialized to a value of one, representing that the current burst is the first burst. A decrement burst variable is initialized to a desired value indicating the burst after which USF decoder 116 will prematurely decode. For example, in one embodiment the decrement burst variable is set equal to three. A decrement burst variable value of three indicates that USF decoder 116 will advantageously prematurely decode one burst early (i.e. after the third burst). Decoding N bursts early advantageously allows for approximately an extra N×4.615 ms of processing and decoding time compared to decoding the USF after four bursts are received, yet can still maintain signal loss and errors at a reasonable level. As mentioned herein, it is contemplated that in one embodiment USF decoder 116 will decode earlier than the burst indicated by the decrement burst variable, assuming that the received data is of high enough quality.

At step 414, the current received burst of data is passed through receive filter 313. One purpose of filtering the data is to remove out-of-bounds interfering signals. At step 416, various processing occurs at equalizer 315. This processing might include various basic modem housekeeping algorithms related to automatic frequency control (AFC), automatic gain control (AGC), direct current (DC) correction, timing adjustment, and the like. At step 418, the current received burst is equalized at equalizer 315. At step 420, the USF related portion of the current equalized received burst is extracted by extract module 318.

At step 422, BB/DSP 314 determines if the value of the burst number variable (representing the number of bursts that have been received thus far, which was initially set equal to a value of one) is equal to the value of the decrement burst variable (representing the number of the received burst after which an attempt at premature decoding will be made; at step 412, the decrement burst variable was set equal to a value of three in one embodiment).

If, at step 422, the value of the burst number variable is not equal to the value of the decrement burst variable, then the process proceeds to step 424. In one embodiment, step 424 is optional and can be omitted. If step 424 is omitted then if, at step 422, the value of the burst number variable is not equal to the value of the decrement burst variable then the process proceeds to step 426. If, at step 422, the value of the burst number variable is equal to the value of the decrement burst variable, then the process proceeds to step 430.

At step 424, BB/DSP 314 determines if the received data quality is higher than a given threshold. If, at step 424, the received data quality is not higher than a given threshold then the process proceeds to step 426. If, at step 424, the received data quality is higher than a given threshold then the process proceeds to step 430. Advantageously, the system recognizes that if the received data is of high enough quality, then from a limited number of bursts (perhaps only a single burst) the USF data can be decoded with a high level of confidence. Thus, processing bottlenecks are advantageously even further reduced.

At step 426, the value of the burst number variable is incremented by a value of one. At step 428, mobile station 104 waits for the next burst to arrive, and then the process proceeds to step 414. At step 430, the accumulated USF related data is passed to USF decoder 116. At step 432, USF decoder 116 decodes the USF word. The various methods of decoding USF data (e.g. soft decoding, hard decision decoding, and the like) are known in the art. Thus, mobile station 104 now has the USF data as transmitted by base station 102.

At step 434, BB/DSP 214 configures the next transmit slot as instructed by the decoded USF data. At step 436, BB/DSP 314 sends the decoded USF data to BB microcontroller 320. At step 438, mobile station 104 waits for the transmission of the next block of USF data to begin.

In another embodiment, a hybrid solution is adopted. A subset of the four received USF codewords are decoded using all four bursts, and the remainder of the USF codewords are decoded using three or fewer bursts. The distribution of decoding lengths could be done randomly or, alternatively, could be done by monitoring the quality of the underlying channel for each burst and from this the slots with the best signal-to-noise (SNR) ratio could be prematurely truncated while the slots exhibiting the worst SNR are allowed to wait until the climax of the fourth slot before decoding the USF.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention. For example, in various embodiments the blocks shown in the figures can be implemented in hardware, software, or a combination thereof. The blocks may comprise hardware containing embedded software, in one embodiment. The input and output of the blocks may represent physical connections between hardware and/or logical connections among software routines. Additionally, embodiments according to the invention are not limited to words comprising four bursts of data having nine bits per burst.

Thus reducing USF schedule bottlenecks in EDGE through premature USF decoding has been described.

The invention claimed is:

1. A method of communicating in a wireless communication system, said method comprising the steps of:
    (a) setting a decrement burst variable to be equal to a predetermined number representing a number of bursts of data from which to prematurely decode a USF codeword;
    (b) receiving a received burst of data comprising USF related data related to a portion of a USF codeword;
    (c) extracting said USF related data from said equalized received burst of data;
    (d) determining if a burst number variable is equal to said decrement burst variable;
    (e) incrementing said burst number variable and repeating (b) through (d) if said burst number variable is not equal to said decrement burst variable;
    (f) decoding said USF codeword if said burst number variable is equal to said decrement burst variable.

2. The method of claim 1 wherein said communicating is performed using a GSM/EDGE standard.

3. The method of claim 1 further comprising setting said burst number variable equal to 1 before receiving said received burst of data.

4. The method of claim 1 further comprising filtering said received burst of data after step (b).

5. The method of claim 1 further comprising performing AFC functions on said received burst of data after step (b).

6. The method of claim 1 further comprising performing AGC functions on said received burst of data after step (b).

7. The method of claim 1 further comprising equalizing said received burst of data to produce an equalized received burst of data after step (b).

8. The method of claim 1 wherein step (f) comprises decoding said USF codeword prematurely.

9. The method of claim 1 further comprising, after step (d) and before step (e), determining if a received data quality is higher than a threshold, and if so performing step (f), and if else performing step (e).

10. A wireless communication system including a base station and a mobile station communicating over an RF channel, said wireless communication system comprising:
    a first module for performing a step of (a) setting a decrement burst variable to be equal to a predetermined number representing a number of bursts of data from which to prematurely decode a USF codeword;
    a second module for performing a step of (b) receiving a received burst of data comprising USF related data related to a portion of a USF codeword;

a third module for performing a step of (c) extracting said USF related data from said equalized received burst of data;

a fourth module for performing a step of (d) determining if a burst number variable is equal to said decrement burst variable;

a fifth module for performing a step of (e) incrementing said burst number variable and repeating step (b) through step (d) if said burst number variable is not equal to said decrement burst variable;

a sixth module for performing a step of (f) decoding said USF codeword if said burst number variable is equal to said decrement burst variable.

11. The wireless communication system of claim 10 wherein said communicating is performed using a GSM/EDGE standard.

12. The wireless communication system of claim 10 further comprising a seventh module for setting said burst number variable equal to 1 before receiving said received burst of data.

13. The wireless communication system of claim 10 further comprising an eighth module for equalizing said received burst of data to produce an equalized received burst of data after step (b).

14. The wireless communication system of claim 10 wherein step (f) comprises decoding said USF codeword prematurely.

15. The wireless communication system of claim 10 further comprising a ninth module for determining, after step (d) and before step (e), if a received data quality is higher than a threshold, and if so performing step (f), and if else performing step (e).

16. A computer readable medium including computer software program executable by a processor in a wireless communication system, said computer software program comprising:

code for executing a step of (a) setting a decrement burst variable to be equal to a predetermined number representing a number of bursts of data from which to prematurely decode a USF codeword;

code for executing a step of (b) receiving a received burst of data comprising USF related data related to a portion of a USF codeword;

code for executing a step of (c) extracting said USF related data from said equalized received burst of data;

code for executing a step of (d) determining if a burst number variable is equal to said decrement burst variable;

code for executing a step of (e) incrementing said burst number variable and repeating step (b) through step (d) if said burst number variable is not equal to said decrement burst variable;

code for executing a step of (f) decoding said USF codeword if said burst number variable is equal to said decrement burst variable.

17. The computer software program of claim 16 wherein said communicating is performed using a GSM/EDGE standard.

18. The computer software program of claim 16 further comprising code for equalizing said received burst of data to produce an equalized received burst of data after step (b).

19. The computer software program of claim 16 wherein code for step (f) comprises code for decoding said USF codeword prematurely.

20. The computer software program of claim 16 further comprising code for determining, after step (d) and before step (e), if a received data quality is higher than a threshold, and if so performing step (f), and if else performing step (e).

* * * * *